(12) United States Patent
Banta et al.

(10) Patent No.: US 9,112,995 B2
(45) Date of Patent: Aug. 18, 2015

(54) CALENDAR-BASED CALLING

(75) Inventors: Donald J. Banta, Colorado Springs, CO (US); Martin W. McKee, Herndon, VA (US); Ira C. Stevens, Quakertown, PA (US); Victor Y. Valenzuela, Tigard, OR (US); Stephen E. Chiapella, Oregon City, OR (US); Alma Von Duhn, Chandler, AZ (US); Abdul S. Raheem, Hyderabad (IN); Sridhar Kancharlapalli, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/600,946

(22) Filed: Aug. 31, 2012

(65) Prior Publication Data

US 2014/0064465 A1    Mar. 6, 2014

(51) Int. Cl.
*H04M 3/42*    (2006.01)
*H04M 11/00*   (2006.01)

(52) U.S. Cl.
CPC ...................... *H04M 11/00* (2013.01)

(58) Field of Classification Search
USPC ......... 379/202.01–207.03; 370/260; 455/416; 348/14.01–16.16; 709/204
See application file for complete search history.

(56) References Cited

U.S. PATENT DOCUMENTS

| | | | |
|---|---|---|---|
| 6,275,575 B1* | 8/2001 | Wu | 379/202.01 |
| 6,798,753 B1* | 9/2004 | Doganata et al. | 370/260 |
| 2010/0150330 A1* | 6/2010 | Perry et al. | 379/202.01 |
| 2011/0075826 A1* | 3/2011 | Block | 379/142.04 |
| 2011/0228922 A1* | 9/2011 | Dhara et al. | 379/202.01 |
| 2011/0271206 A1* | 11/2011 | Jones et al. | 715/753 |
| 2012/0269334 A1* | 10/2012 | Goguen et al. | 379/202.01 |
| 2013/0143539 A1* | 6/2013 | Baccay et al. | 455/416 |

* cited by examiner

*Primary Examiner* — Joseph J Nguyen (57) ABSTRACT

A calendar included in a computing device receives an item relating to a conference call. An automated parser is used to parse the item to obtain information relating to the conference call. The conference call information in is stored a conference application and is used to initiate a conference call.

17 Claims, 6 Drawing Sheets

CALENDAR-BASED CALLING

BACKGROUND INFORMATION

Events such as audio and/or video conference calls are pervasive in today's world. Often, such events are scheduled using electronic mechanisms such as e-mail messages, electronic calendar entries, and the like. However, users may not have efficient mechanisms for keeping track of various events, or for accessing various events. For example, users may not have efficient mechanisms for dialing conference call numbers, passcodes, etc., or for conveniently storing and accessing this information as well as information relating to a time and date of an event such as a call, etc.

DETAILED DESCRIPTION OF PREFERRED EMBODIMENTS

Figure 1:
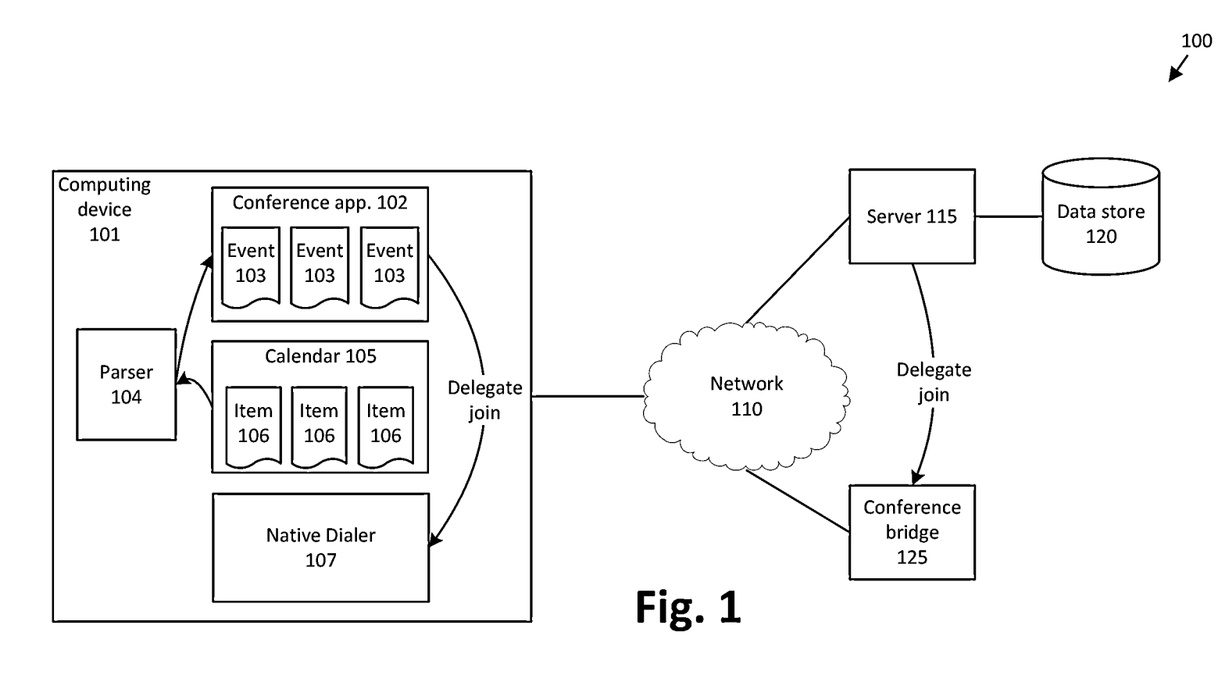
FIG. 1 illustrates an exemplary system for calendar-based calling.

FIG. 1 illustrates an exemplary system 100 for calendar-based calling. The system 100 includes a client 101, the client 101 in turn including a conference application 102 that stores and manages events 103, an automated parser 104 that parses items 106 in a calendar 105, and a native dialer 107. The client 101 may communicate, via a network 110, with a conference server 115 that may include or be communicatively coupled to, a conference data store 120. The client 101 may also communicate with a conference bridge 125.

A client 101 may be any one of a variety of computing devices, such as a desktop computer, laptop computer, tablet computer, smart phone, personal digital assistant, etc. In general, a client 101 includes a memory and a processor, the memory storing instructions executable by the processor, e.g., instructions such as may be included in an application 102, parser 104, native dialer 107, etc., as well as instructions included in an operating system or other code running on the client 101. In some instances, the client 101 may be a mobile computing device such as a smart phone or the like.

Conference application 102 includes instructions for managing events 103 such as audio and/or video conference calls that may be accessed from the client 101. Exemplary operations of the client application 102 are discussed further below, including with respect to FIGS. 2-5, which illustrate exemplary graphical user interfaces (GUIs) that may be provided via the application 102. In general, the application 102 may allow a user to view events 103, e.g., meetings or conferences, that the parser 104 has identified from calendar 105, events 103 that the user has added to the conference application 102, as well as meetings and/or events 103 added by other users. Accordingly, conference application 102 generally includes a mechanism for storing and accessing event 103 data in a client 101.

For example, the conference application 102 may be in communication with the server 115, which may regularly update the conference application 102 according to information entered in the data store 120. For example, a first user may enter information relating to an event 103, including an identification of a second user as an event 103 participant, into an interface provided by a conference application 102 included on a client 101 associated with the first user. The event 103 information provided by the first user is then communicated to server 115 via the network 110, and stored in the data store 120. Information relating to the event 103 may then be provided, from the data store 120 by the server 115, to a conference application 102 included on a client 101 of the second user via the network 110.

Accordingly, events 103 may sometimes, but not always, correspond to items 106 in calendar 105. The parser 104 generally reads one or more items 106 in the calendar 105 to identify events 103 such as conference calls. For example, the parser 104 may be a natural language parser such as disclosed in co-pending application Ser. No. 13/117,316, entitled "A System for and Method of Parsing Electronic Mail," which application is fully incorporated by reference herein in its entirety. In general, calendar 105 may include entries received in the form of e-mails or the like, and parser 104 may use fields in an e-mail meeting request or the like, such as the subject field, a date field, a location field, etc., or may simply parse information from the body of an e-mail, to obtain event 103 information. In general, event 103 information includes data such as a time, a date, event 103 access information, e.g., a call identifier such as a telephone number or network address, etc.

The calendar application 105 is generally a standard calendar application, e.g., such as may be included with a smart phone operating system or the like. Items 106 included in the calendar application 105 may include meetings, e.g., audio and/or video conferences (referred to generally herein as "conference calls"), as well as other events. Items 106 may employ known formats, nomenclatures, etc., utilized by the parser 104 to identify conference calls, including constituent elements of conference calls, such as a meeting title, phone number, access code or passcode, etc., in an item 106.

Native dialer 107 is a software application generally included in an operating system of client 101 that can perform operations, e.g., dialing a telephone number, accessing a network address, etc., to join conference calls. For example, smart phone operating systems such as Apple Corporation's iOS, or Google Inc.'s Android operating system generally included native dialers. As illustrated in FIG. 1, conference application 102 may delegate native dialer 107 to join conference calls on behalf of the conference application 102.

Network 110 is generally a packet network, and may incorporate one or more of a cellular network, the Internet, a wide area network, a local area network, etc.

Conference server 115 may be a general-purpose computing device including a memory and a processor, the memory storing instructions executable by the processor, e.g., instructions for carrying out steps and processes as disclosed herein. Conference server 115 generally receives information from one or more conference applications 102, and may store profile information and other client 101 metadata in data store 120. Further, events 103 may be synchronized between the data store 120 and a client 101.

Data store 120 may be a relational database or the like included within server 115 or, more likely, within one or more separate computing devices in communication with server 115.

Conference bridge 125 is generally a network element for establishing and maintaining conference calls. For example, server 115 may delegate conference bridge 125 to join conference calls on behalf of a client 101, or a client 101 may access the conference bridge 125 directly, e.g., by the invocation of native dialer 107 by the conference application 102.

Figure 2:
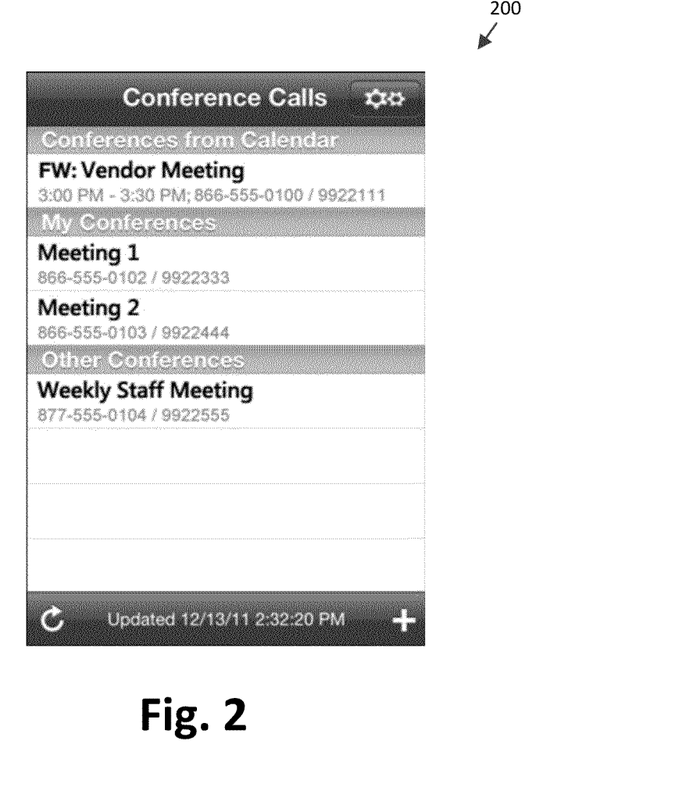
FIG. 2 is an exemplary graphical user interface provided by a conference application.
Figure 3:
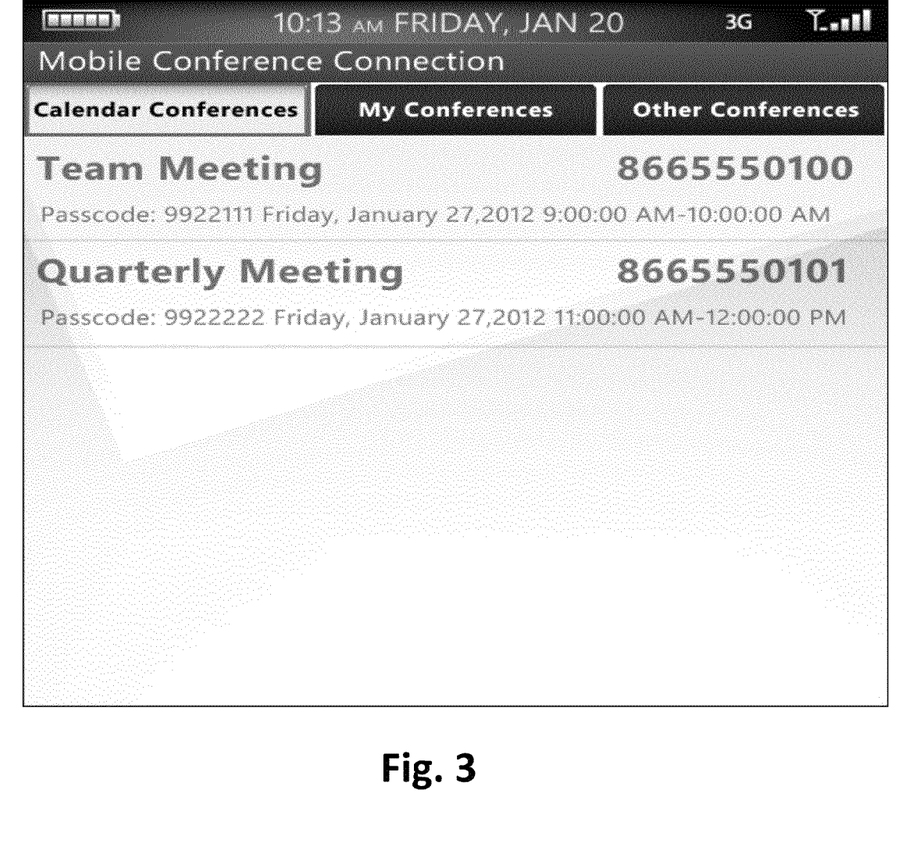
FIG. 3 is a further exemplary graphical user interface provided by a conference application displaying a "Calendar Conferences" category of events.
Figure 4:
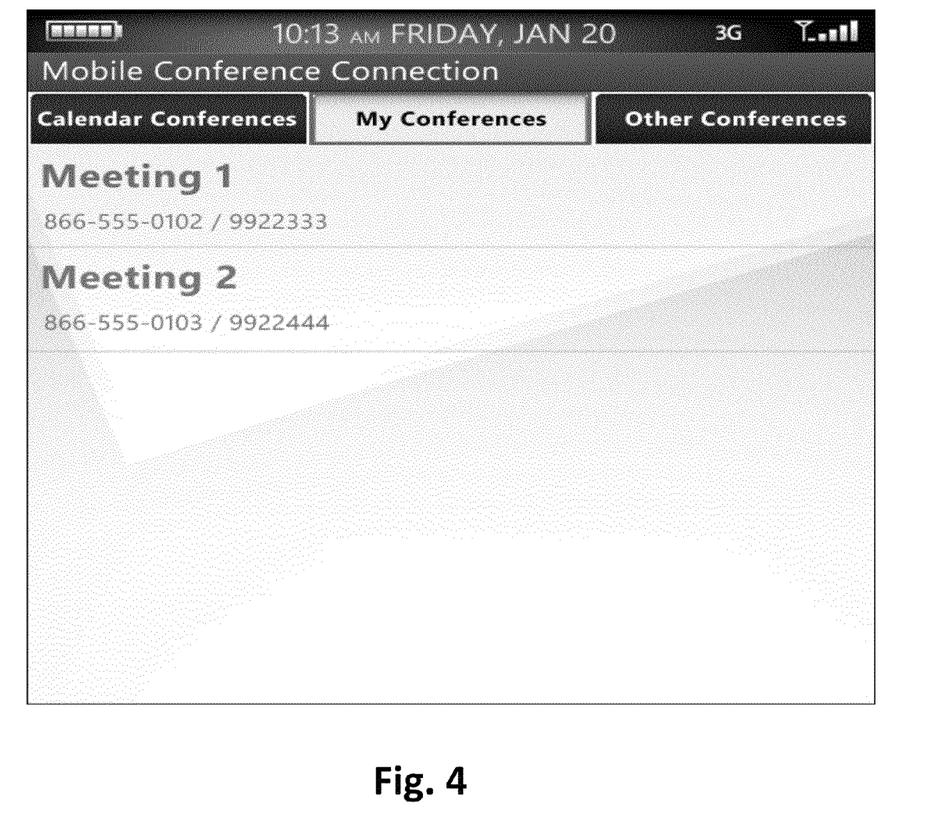
FIG. 4 is a further exemplary graphical user interface provided by a conference application displaying a "My Conferences" category of events.
Figure 5:
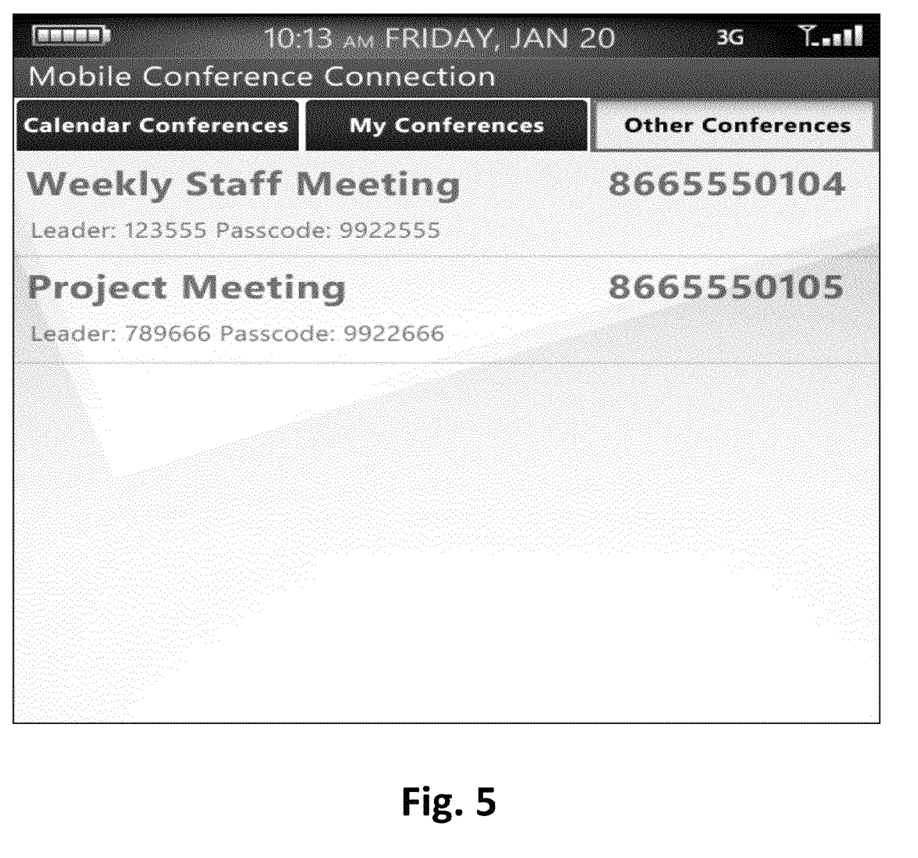
FIG. 5 is a further exemplary graphical user interface provided by a conference application displaying a "Other Conferences" category of events.

FIG. 2 is an exemplary graphical user interface 200 provided by a conference application 102. The interface 200 shows three categories of events 103 stored in the conference application 102. A first category of event 103, labeled "Conferences From Calendar" in the interface 200, includes events 103 obtained from client 101 calendar 105, e.g., by using the parser 104 as discussed above. A second category of event 103, labeled "My Conferences," in interface 200 includes events that a user has added to the application 102. A third category of event 103, labeled "Other Conferences" in interface 200, includes conferences that other users may have added, e.g., using a conference application 102 on a different client 101 to access the conference server 115, which then updates respective clients 101 associated with the event 103, as described above. FIGS. 3, 4, and 5 illustrate further exemplary graphical user interfaces 300, 400, in 500, respectively, representing the foregoing categories of events 103.

Figure 6:
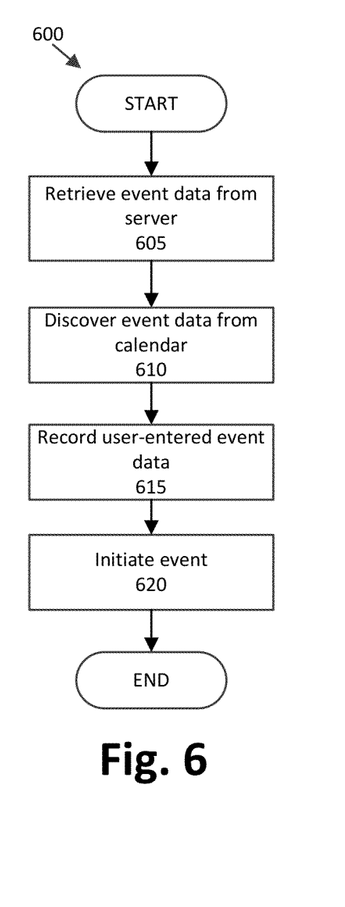
FIG. 6 is a diagram of an exemplary process for initiating event from a conference application.

FIG. 6 is a diagram of an exemplary process 600 for initiating event from a conference application.

The process 600 begins in a step 605, when the conference application 102 receives and stores event 103 data from the conference server 115. For example, as mentioned above, users of clients 101 may create event 103 data that is stored in data store 120 associated with the conference server 115. Such data may then be synchronized with clients 101 of other users as also discussed above.

Next, in a step 610, the conference application 102 discovers event 103 data from the calendar 105. For example, the parser 104 may be used to parse e-mail messages, calendar entries, etc. stored in the calendar 105 to identify one or more events 103, which are then stored by the application 102. Further details concerning discovery of event 103 data on the calendar 105 are discussed below with respect to FIG. 7.

Next, in a step 615, the conference application 102 receives and stores user-entered event 103 data. For example, the application 102 may provide a GUI for a user to enter a time, date, dial-in number, passcode, etc. for a conference call. Some information, e.g., a conference call dial-in number and passcode, may be stored, and provided by default, in the application 102 for a user of client 101. Further, user-entered event 103 data may be synchronized with the server 115 and possibly also with other clients 101, as discussed above.

Next, in a step 620, an event 103 is initiated. For example, the conference application 102 may delegate the native dialer 107 to place a call, e.g., via the conference bridge 125. The call may be placed according to information stored in one of steps 605, 610, or 615. For example, a user may select a call and provide input to the application 102 to initiate the call, whereupon the native dialer 107 is invoked, and the call is placed. Typically, conference bridge 125 requires a passcode, which may be included in parsed information or which may be provided from some other source, such as a user's manual entry or information stored in the application 102; further, a passcode may be dialed by the native dialer 107 in addition to a telephone number after a configurable delay. The passcode generally may either be a leader passcode (which may provide special features for the bridge 125 for the calling party) or a participant passcode.

Following step 620, the process 600 ends.

Figure 7:
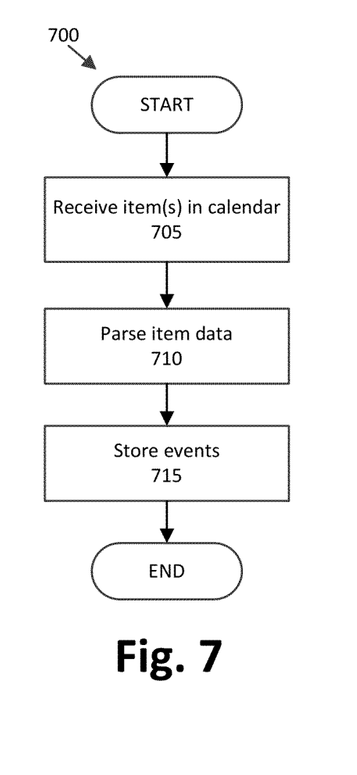
FIG. 7 is a diagram of an exemplary process for storing an event from a calendar in a conference application.

FIG. 7 is a diagram of an exemplary process 700 for storing an event from a calendar in a conference application.

The process 700 begins in a step 705, in which the calendar 105 receives one or more items 106. For example, client 101 may include an e-mail client that receives calendar items 106 in the form of e-mail messages. Such items may then be stored in the calendar 105 as calendar entries.

Next, in step 710, parser 104 parses item 106 data to identify one or more events 103 indicated by the item 106 data. The parser 104 is generally invoked when then application 102 is initiated, and generally reviews a predetermined period of time (generally configurable by a user) within the calendar 105. The parser 104 can also be initiated manually by the user. When the parser 104 evaluates any particular calendar 105 text, e.g., in items 106, it may return a list of results ordered from most likely to least. In one implementation, only the most likely results are used and stored. If the parser 104 fails to find any events 103, the result list would be empty. Each item in a result list generally includes a dictionary of conference bridge 125 telephone numbers, and generally also their corresponding passcode(s), in addition to optional items such as, a type of call (e.g., toll-free) and an operating region (e.g., Paris, France) for the conference bridge 125.

Next, in step 715, the conference application 102 stores event 103 data, parsed from one or more items 106 as described with respect to step 710. For example, as mentioned above, conference application 102 generally includes a mechanism for storing event 103 data in a memory of a client 101.

Following step 715, the process 700 ends.

Computing devices such as those disclosed herein may employ any of a number of computer operating systems, including, but by no means limited to, versions and/or varieties of the Microsoft Windows® operating system, the iOS by Apple Computer, Inc., Android by Google, Inc., the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. Computing devices in general may include any one of a number of computing devices, including, without limitation, a computer workstation, a desktop, notebook, laptop, or handheld computer, or some other computing device.

Computing devices such as disclosed herein further generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Database 115 may be any of a variety of known RDBMS packages, including IBM® DB2, or the RDBMS provided by Oracle Corporation of Redwood Shores, Calif.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving, in a calendar included in a mobile computing device, an item relating to a first conference call added by a first user;
   using an automated parser to parse the item to obtain first conference call information relating to the first conference call, wherein the first conference call information includes a time, a date, event access information, and a first passcode;
   storing the first conference call information with the computing device and with a conference server, the conference server having second conference call information relating to a second conference call added by a second user, wherein the second conference call information includes a second passcode;
   storing the second conference call information of the second user obtained from the storing of the first conference call information of the first user with the conference server;
   selecting, using the mobile computing device, at least one of the first conference call of the first user and the second conference call of the second user; and
   initiating the selected conference call by placing a call using at least one of the first and second passcodes associated with the selected conference call.

2. The method of claim 1, wherein the conference server stores the conference call information with at least one additional mobile computing device.

3. The method of claim 1, further comprising presenting the first and second conference call information in a graphical user interface on the mobile computing device including showing first and second categories of conference calls, the first category being conferences from the calendar of the first user and the second category being conferences added by the second user.

4. The method of claim 1, wherein placing the call further comprises dialing a telephone number using a native dialer that also enters at least one of the first and second passcodes after a configurable delay once a conference call telephone number has been dialed.

5. The method of claim 1, wherein the automated parser uses natural language parsing.

6. The method of claim 1, wherein initiating the selected conference call includes using a conference bridge.

7. A system, comprising:
   a conference server; and
   a mobile computing device connected via a network to the conference server where said mobile computing device is configured to:
   receive an item related to a first conference call added by a first user;
   use an automated parser to parse the item to obtain first conference call information relating to the first conference call, wherein the first conference call information includes a time, a date, event access information, and a first passcode;
   store the first conference call information in the mobile computing device and with the conference server, the conference server having second conference call information relating to a second conference call added by a second user, wherein the second conference call information includes a second passcode;
   store the second conference call information of the second user obtained from the storing of the first conference call information of the first user with the conference server;

select at least one of the first conference call of the first user and the second conference call of the second user; and initiate the selected conference call by placing a call using at least one of the first and second passcodes associated with the selected conference call.

8. The system of claim 7, wherein the conference server is configured to store the conference call information with at least one additional mobile computing device.

9. The system of claim 7, wherein placing the call further comprises dialing a telephone number using a native dialer that also enters at least one of the first and second passcodes after a configurable delay once a conference call telephone number has been dialed.

10. The system of claim 7, wherein the mobile computing device is configured to receive an item related to a conference call, wherein the item is an email item.

11. The system of claim 7, wherein the mobile computing device is configured to receive an item related to a conference call, wherein the item is a calendar item.

12. The system of claim 7, wherein the mobile computing device is configured to initiate the conference call by both i) using the conference server and ii) using a native dialer.

13. The system of claim 7, wherein initiate the selected conference call includes the use of a conference bridge.

14. A non-transitory computer-readable medium tangibly embodying computer-executable instructions, the instructions when executed by a processor provide operations comprising:

receiving an email item, using a mobile computing device, relating to a first conference call added by a first user;

using an automated parser to parse the item to obtain first conference call information relating to the first conference call, wherein the first conference call information includes a time, a date, event access information, and a first passcode;

storing the first conference call information in the mobile computing device and with a conference server, the conference server having second conference call information relating to a second conference call added by a second user, wherein the second conference call information includes a second passcode;

storing the second conference call information of the second user obtained from the storing of the first conference call information of the first user with the conference server;

selecting at least one of the first conference call of the first user and the second conference call of the second user; and initiating the selected conference call by placing a call using at least one of the first and second passcodes associated with the selected conference call.

15. The medium of claim 14, wherein the conference server is configured to store the conference call information with at least one additional mobile computing device.

16. The medium of claim 14, wherein placing the call further comprises dialing a telephone number using a native dialer that also enters at least one of the first and second passcodes after a configurable delay once a conference call telephone number has been dialed.

17. The medium of claim 14, wherein initiating the selected conference call includes using a conference bridge.

* * * * *